United States Patent
Dukatz et al.

(10) Patent No.: US 10,960,540 B2
(45) Date of Patent: Mar. 30, 2021

(54) ROBOT ORCHESTRATION ARCHITECTURE

(71) Applicant: Accenture Global Solutions Limited, Dublin (IE)

(72) Inventors: Carl Matthew Dukatz, San Jose, CA (US); Nicholas Akiona, San Jose, CA (US)

(73) Assignee: Accenture Global Solutions Limited, Dublin (IE)

( * ) Notice: Subject to any disclaimer, the term of this patent is extended or adjusted under 35 U.S.C. 154(b) by 409 days.

(21) Appl. No.: 15/950,407

(22) Filed: Apr. 11, 2018

(65) Prior Publication Data

US 2018/0319014 A1    Nov. 8, 2018

Related U.S. Application Data

(60) Provisional application No. 62/502,106, filed on May 5, 2017.

(51) Int. Cl.
| | |
|---|---|
| *B25J 9/16* | (2006.01) |
| *G05D 1/00* | (2006.01) |
| *G06F 3/16* | (2006.01) |
| *H04L 29/08* | (2006.01) |

(52) U.S. Cl.
CPC ............. *B25J 9/163* (2013.01); *B25J 9/1653* (2013.01); *B25J 9/1694* (2013.01); *B25J 9/1697* (2013.01); *G05D 1/0016* (2013.01); *G05D 1/0088* (2013.01); *G06F 3/167* (2013.01); *G05D 2201/0215* (2013.01); *H04L 67/12* (2013.01); *Y10S 901/02* (2013.01); *Y10S 901/46* (2013.01); *Y10S 901/47* (2013.01)

(58) Field of Classification Search
CPC ........ B25J 9/163; B25J 9/1653; B25J 9/1694; B25J 9/1697; G05D 1/0016; G05D 1/0088; G05D 2201/0215; G06F 3/167; Y10S 901/47; Y10S 901/02; Y10S 901/46; H04L 67/12
See application file for complete search history.

(56) References Cited

U.S. PATENT DOCUMENTS

| | | | |
|---|---|---|---|
| 9,671,777 B1 | 6/2017 | Aichele et al. | |
| 2008/0141220 A1 | 6/2008 | Kim et al. | |
| 2015/0142437 A1* | 5/2015 | Kobayashi | G10L 15/08 704/246 |

(Continued)

*Primary Examiner* — Basil T. Jos
(74) *Attorney, Agent, or Firm* — Fish & Richardson P.C.

(57) ABSTRACT

Implementations directed to providing a computer-implemented system for performing an action with a robot comprising receiving command information indicating a command related to performance of an action with a robot, identifying state information for a plurality of active routines that are actively running for the robot, the state information indicating a state for each of the active routines, determining contextual information for the command based on the accessed state information for the plurality of active routines, selecting one of the active routines as a handling routine to service the command based on the contextual information, determining an output module of the robot to perform the action based on the state of the handling routine and the contextual information, and executing one or more instructions to perform the action with the output module.

20 Claims, 7 Drawing Sheets

(56) References Cited

U.S. PATENT DOCUMENTS

2015/0217449 A1* 8/2015 Meier .................. B25J 9/1602
700/257
2017/0008174 A1* 1/2017 Rosen .................. B25J 9/1694
2019/0057696 A1* 2/2019 Ogawa .................. B25J 13/003

* cited by examiner

ROBOT ORCHESTRATION ARCHITECTURE

CROSS-REFERENCE TO RELATED APPLICATION

This application claims priority under 35 U.S.C. § 119 to U.S. Provisional Patent Application Ser. No. 62/502,106, filed May 5, 2017, which is incorporated herein by reference in its entirety.

FIELD

This specification generally relates to an architecture employed to create human-robot interactions (HRIs).

BACKGROUND

As robots increasingly make their way into roles within human environments (e.g., homes, schools, and hospitals), so too does the everyday interaction between people and robots. Additionally, the sophistication of HRIs continues to increase as robot functionality expands and improves. Moreover, a person who is interacting and/or working with a robot should not be required to learn a new form(s) of interaction. Consequently, robot designers face challenges in modeling social intelligence that enables actuation by a robot based on HRI inputs in an intuitive, contextual fashion.

SUMMARY

Implementations of the present disclosure are generally directed to performing an action with a robot. More specifically, implementations are directed to a Robot Orchestration Architecture (ROA) for a general purpose robotics system that takes into account different inputs and enables actuation by a robot(s) based on those inputs in an intuitive, contextual fashion.

In some implementations, actions include receiving command information indicating a command related to performance of an action with a robot, identifying state information for a plurality of active routines that are actively running for the robot, the state information indicating a state for each of the active routines, determining contextual information for the command based on the accessed state information for the plurality of active routines, selecting one of the active routines as a handling routine to service the command based on the contextual information, determining an output module of the robot to perform the action based on the state of the handling routine and the contextual information, and executing one or more instructions to perform the action with the output module. In some implementations, actions include determining an instruction for a roll back action, wherein the handling routine is a controller routine, and executing instructions to perform the roll back action with the output module. In some implementations, actions include determining that the handling routine has permissions to provide the instructions to the output module. Other implementations of this aspect include corresponding systems, apparatus, and computer programs, configured to perform the actions of the methods, encoded on computer storage devices.

These and other implementations can each optionally include one or more of the following features: the command information includes raw sound wave data collected by a sound collecting sensor, the command information includes textual data indicating the command, and the textual data is determined by a speech recognition module based on the raw sound wave data, the command information includes visual information collected by a light sensor, wherein determining the contextual information comprises determining the contextual information based on calls to a machine learning agent (MLA) associated with each of the respective active routines that are actively running, and each MLA is provided the command information when called, each of the MLA returns a matching intent based on a context for the respective active routine and the command information, wherein selecting one of the active routines as the handling routine comprises selecting the handling routine based on the returned matching intent from the respective MLA and a level assigned to the handling routine within a defined hierarchy for the active routines, at least one of the MLAs is a natural language processing (NLP) service, the output module is a robot base controller or a robot arm controller and the active routines were downloaded from a cloud-based routine repository, and the active routines comprise high-level control (HLC) routines and manipulation routines.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Technology is rapidly progressing in the areas of robotics, the internet of things, and other areas that use machine-learning algorithms. Example robots include autonomous vehicles, surveillance and security robots, robotic manipulator arms, medicinal transport robots, vacuum cleaning robots, legged entertainment robots, and so forth. As such, the structures, mechanisms, electronics, sensors, actuators, and their interconnections vary greatly across robots. For many of these different robot types, however, some key challenge exists in creating routines that enable sophisticated HRIs. For example, many of the component technologies that are employed to provide sophisticated HRIs are not mature. These include machine vision technologies, which are generally slow; limited to a trained set of images; and sensitive to lighting, rotation, and partial views. Additionally, robotic object manipulation is also far from robust.

Another key challenge in creating routines that enable sophisticated HRI is understanding the implicit context of various commands and interactions. For example, a single user command can have a completely different intent depending on the underlying context. As such, many of the solutions for the differing HRIs are specialized robots that perform a single routine on a certain set of objects. Therefore, many robotics architectures are inherently monolithic and lack robust inter-operability between the various routines built within the architecture. For example, when creating a robotic routine to perform a particular task within a particular environment, software is typically built to control the interactions between the underlying hardware (e.g., electronics, sensors, and actuators) as well as determine contextualization for supporting the desired HRI. Historically, such a routine is either created from scratch and/or laboriously repurposed from an existing specialized robotics routine. Additionally, development is typically focused on a particular routine and not the interaction and/or shifting between routines or the respective underlining contexts for each. As such, these types of solutions are compartmentalized and not easy adapt to function alongside other routines. Thus, there exists a need for a more robust solution for supporting sophisticated HRI, such as an architecture (i.e., framework), to enable a general purpose robot as well as a special purpose robot or multi-robot systems to adapt to various scenarios.

In view of the foregoing, implementations of the present disclosure are generally directed to a ROA for a general purpose robotics system that takes into account different inputs and enables actuation by a robot(s) based on those inputs in an intuitive, contextual fashion. The ROA enables designers of robotics solutions to easily and more rapidly integrate various routines into a working product, which may include multiple robots. The ROA provides for modularization of functional routines and support for intelligent context recognition both within a routine and between the various supported routines to create sophisticated HRI. Additionally, the ROA supports the deployment of routines in a distributed fashion. The supported distribution and modularization of differing sets of functionality within routines allows for faster development; increased reuse; application like deployment and operation; easy customization of robot features; more sophisticated HRI by, for example; increasing the number and variety of recognized contexts; and bolstered user's trust in the overall robot platform.

The ROA provides intelligent context recognition by capturing commands more intuitively, employing machine learning to determine the appropriate action(s), and routing the commands to an appropriate routine to initiate the intended actions or actuation. Furthermore, the ROA provides a means for managing the lifecycle (e.g., start, stop, and shutdown) of supported routines by, for example, communicating appropriate action(s) to different supported routines. The ROA also supports simultaneous execution of various routines performed by a particular robot or performed by multiple types of robots in a distributed manner, each of which may have different types of communication mechanisms.

Within the ROA, information indicating an issued command is collected from the various inputs (e.g., sensors). The information is analyzed based on machine learning, which includes stateful information for routines actively running within the ROA, to determine the implicit context and the appropriate action(s) to satisfy the command. In some implementations, the ROA captures and processes information from various inputs types (e.g., speech and vision recognition modules) to more accurately interpret an issued command. For example, the ROA may receive a vocal command such as "hit me" or "another card" in combination with a visual cue such a player tapping on the table. The ROA may use both types of collected information and combine them to determine the appropriate routine to send the command and the action to take to satisfy the command. The ROA also provides a mechanism for a robot to determine the appropriate context that may be outside of any of its currently executed routines and to take the appropriate action(s) (e.g., start a new routine). For example, a particular robot may be executing a black jack dealer routine and be given the command to "make me a drink." The robot may process the received command within the ROA to determine that (1) the command falls outside of the current executing routine (i.e., a black jack dealer routine) and (2) the appropriate routine for the command (e.g., a bartender routine). The ROA may then begin the determined appropriate routine in order satisfy the command.

Additionally, the ROA provides for a plug and play ability that supports the use of machine leaning services or agents (HLAs) as, for example, recognition components/modules. HLAs may include third-party, proprietary, open source, open standard, and custom extensions/services (e.g., NLP services). Built in support for these services within the ROA allows for advances in machine vision, speech to text, and other capabilities in the training and interfacing with robots in a more effective manner. Such mechanisms can be used to repurpose or retrain a robot rather than reprogramming the robot or particular routines.

Figure 1:
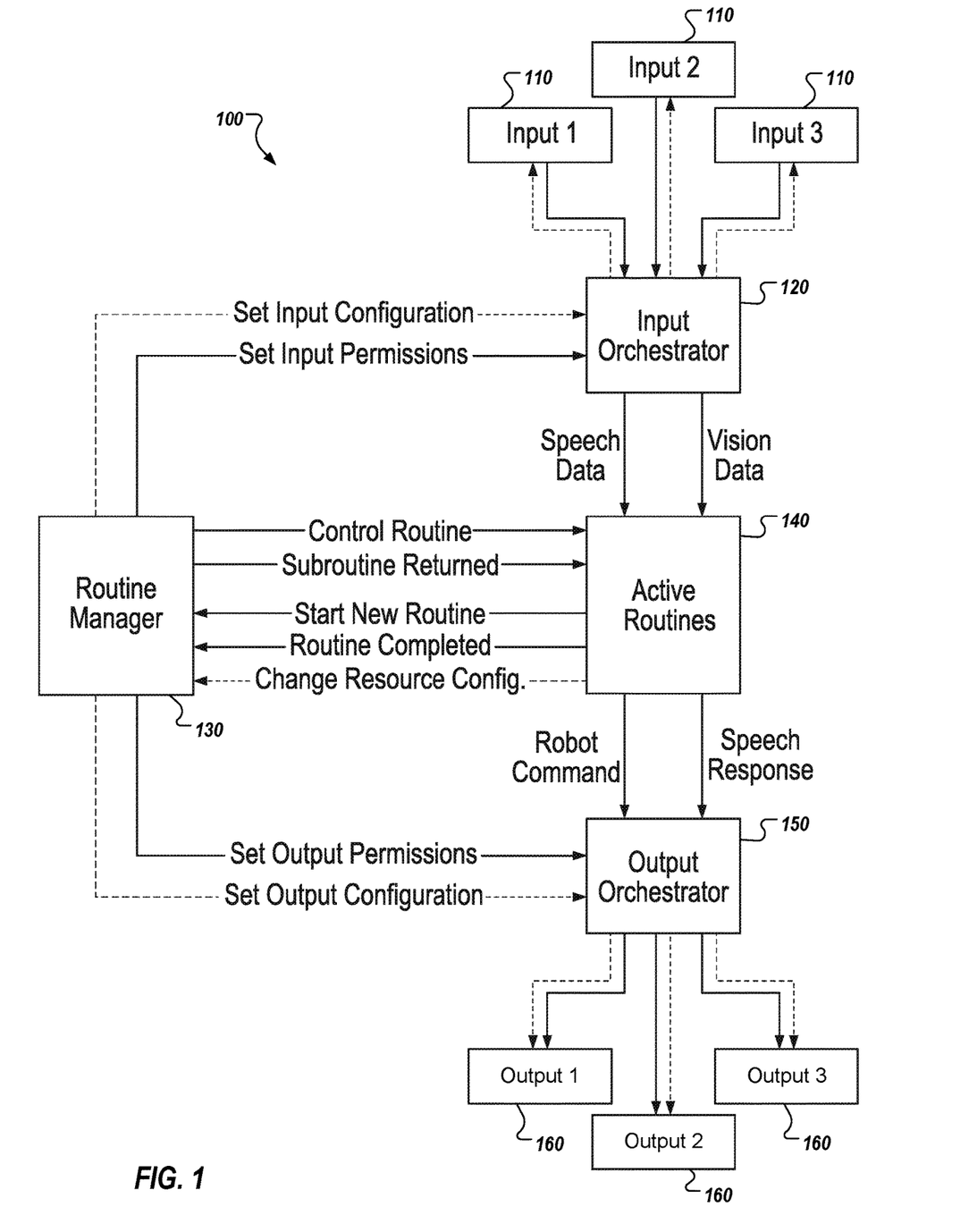
FIG. 1 depicts an example system for providing communication with the ROA.

FIG. 1 depicts an example system 100 for providing communication with the ROA. The example system 100 includes input modules 110, input orchestrator 120, routine manager 130, active routine(s) 140, output orchestrator 150, and output modules 160. In the depicted example, the components of the example system 100 may be managed within an ROA hosted on a robot or any system that provides commands to a series of robots. The example system may be provided using one or more computing device(s) of any suitable number and type of computing device. Configuration of such computing devices include shared, virtual, managed/dedicated, cluster/grid, cloud based resources, and/or any combination thereof and may be integrated as part of a robot's systems or separate from a managed robot(s) and connected through a network.

In the depicted example, input modules 110 collect and interpret information from the surrounding environment. The collected information may be used to determine commands issued from human and other robotic actors. Various input modules 110 may include sensors and corresponding recognition components. Example sensors include sound sensors, such as a microphone; light sensors, such as cameras, photoresistors, and photovoltaic cells, that detect various wavelengths on the light spectrum such as visual and/or infrared; motion sensors; sound, contact sensors; proximity sensors; distance sensors; pressure sensors; tilt sensors; navigational sensors; acceleration sensors; gyroscopes; voltage sensors; motor feedback sensors; and current sensors. Recognition components can include speech recognition and physical cue recognition based on collected sound and/or visual input. In some implementations, the recognition components may be hosted third-party and/or cloud based services, such as NLPs, vision translations, and face recognition.

Output modules 160 serve as the interface to robotic hardware that can be employed to respond to or interact with a user. Example output modules 160 include motorized components such as actuators and servos; sound emitters such as speakers and buzzers; and electromeric emitters such as light-emitting diodes (LEDs), infrared emitters, robot base controllers, robot arm controllers, motor controllers, and radio frequency emitters.

In some implementations, interface with these input 110 and output 160 modules is as high level as possible. For example, rather than sending raw waveform audio file format (WAV) files to the input orchestrator 120, a speech recognition module may perform speech recognition to convert the raw input into text before passing the information to the input orchestrator 120. Similarly, the robot control output may allow for the simple control of the robot end-effector position without low-level joint control and motor feedback.

Figure 2A:
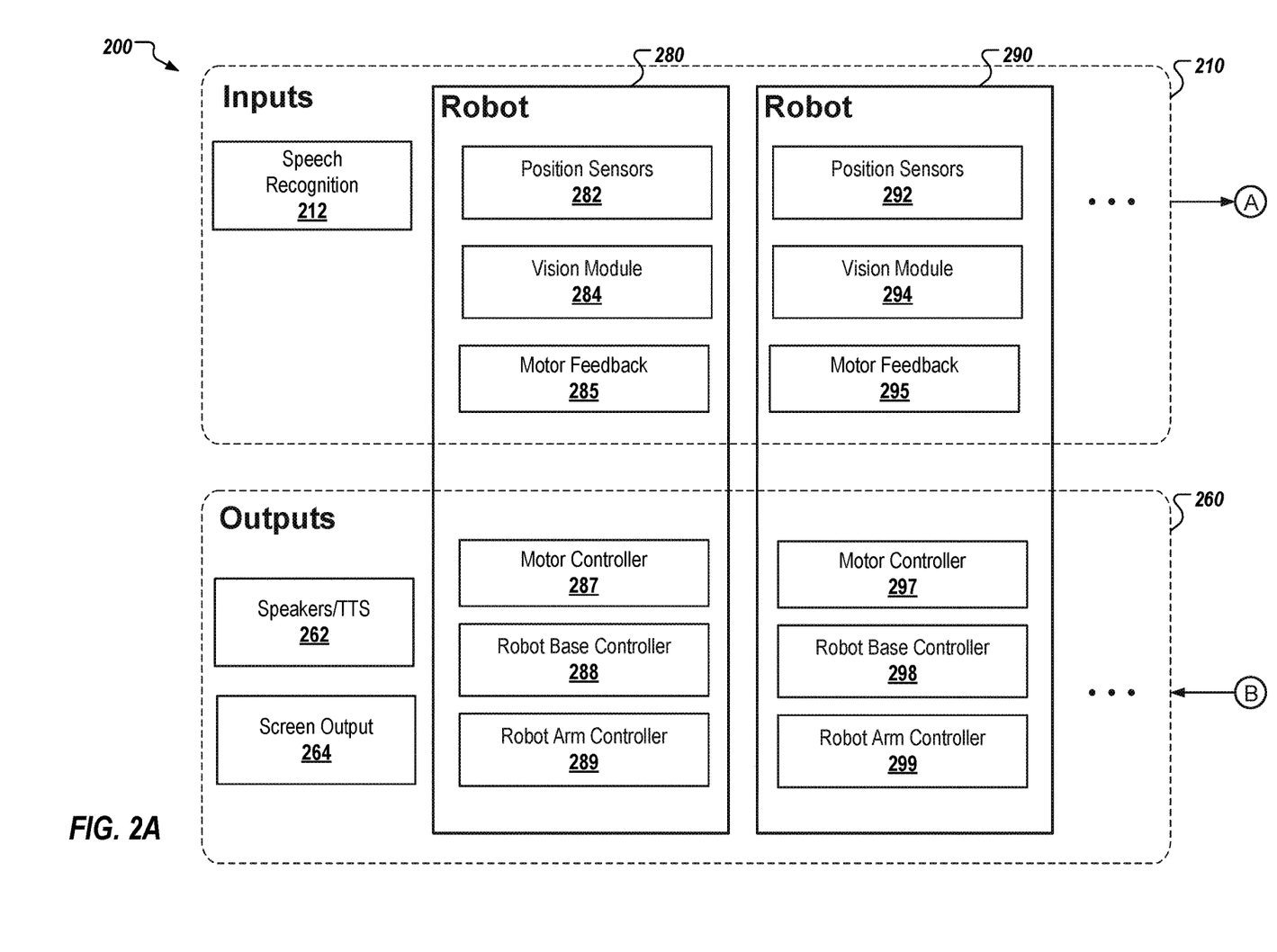
FIGS. 2A-B depict another example system for providing communication with the ROA using, for example, a controller device and multiple robots.

Input orchestrator 120 receives interpreted commands and collected data, such as speech and visual data, and determines the appropriate context for the command. For example, the input orchestrator 120 may employ a mapping routine, which may be implemented as an active routine (see. FIG. 2), to determine the appropriate application level command to activate in order to satisfy the command, or the input orchestrator 120 may determine the appropriate active routine to which to forward the command. This process is described in greater detail below in reference to FIG. 4.

Output orchestrator 150 checks permission and sends information, such as instructions, to the output modules 160 based on an action or response to a received command determined by active routines 140. The input 120 and output 150 orchestrators include functionality allowing them to respond to key events and intelligently manage the flow of information within the example system 100.

Active routines 140 are the currently running (active) routines on the robot. A routine represents a key chunk of functionality or scenarios that may be implemented. Each routine may be passed information received from certain inputs 110 and may issue commands for certain outputs 160. Active routines 140 may include operating system (OS) level routines and application routines. Routines are described in greater detail below in reference to FIGS. 2-4.

For some types of inputs modules 110, an active routine may request the use of a resource and information from that input can be passed to the active routine. For outputs modules 160, active routines with the appropriate permissions may be allowed to control an output module's function such as extending a robot arm or using a speaker to send information through sound waves (e.g., speech). Permission may be granted for a particular output module when, for example, the particular output is not being used by another active routine.

Routine manager 130 provides a hub form of communication for the active routines 140 and allows programmers to reuse and compartmentalize routines within the ROA. The routine manager 130 may send control commands to start, stop, or pause a routine directly to active routines 140. Additionally, routine manager 130 serves as the interface for active routines 140 to start, stop, or provide information to additional routines or subroutines. In some implementations, active routines 140 are not able to directly start other routines because the necessary resources for the routines must be allocated through the routine manager 130. In such implementations, the routine manager 130 manages resource allocation and updates the orchestrators. In some implementations, active routines may allocate certain resources during operation.

When routines start or complete, the routine manager 130 may pass parameters to new routines and return values back to parent routines, respectively. Routine manger 130 may also set permissions and send configurations to the input 120 and output 150 orchestrators. These output permissions, for example, determine which of the output modules 160 that each of the active routines 140 have access and/or permission to use. This functionality in the ROA allows routines to interact in a manner similar to stand alone functions and thereby makes development and decomposition of routines more intuitive for developers.

Figure 2B:
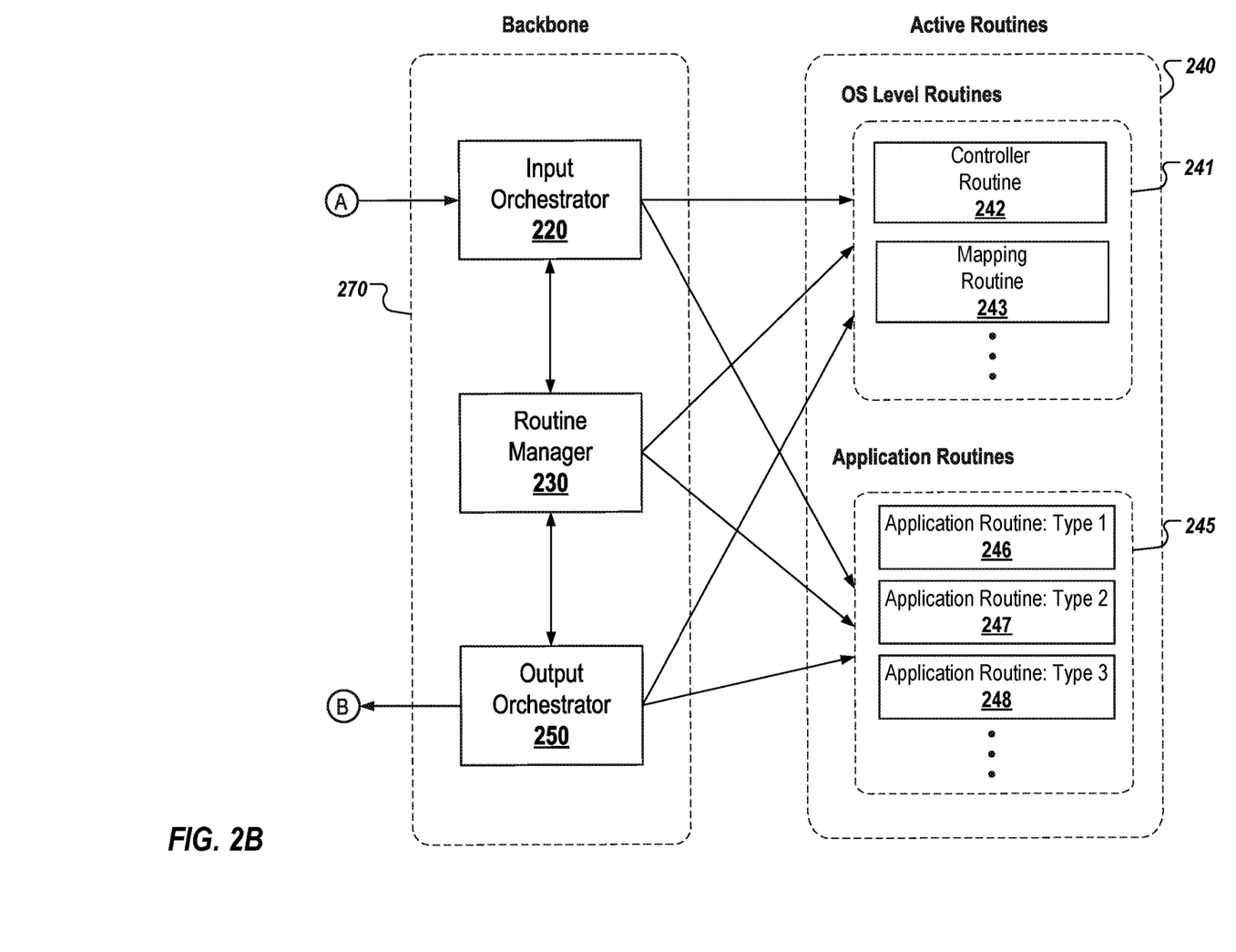

ROA is designed to interface primarily with the high level features of a robot in a fashion similar to an application program interface (API) or software development kit (SDK). As such, routines are designed to be abstracted from intricate features of the robot such as motor torque feedback loops and control algorithms. Additionally, the ROA can be setup to handle a single robot or multiple robots (as depicted in FIGS. 2A-B). Moreover, since communication to and from routines comes through the ROA framework, routines can be transferred between different robots or robot systems. In some implementations, routines may be transferred between robots or robot systems (as depicted in FIG. 3B) with minimal or no alterations, provided the robot/robot system meets the metadata requirements of the routine. Example metadata may include required input types and resolution (e.g., speech input, person identification, and so forth) and expected output configuration (e.g., one robotic arm with a workspace of [x, y, z], one speaker, and so forth).

FIGS. 2A-B depict an example system 200 for providing communication with the ROA using, for example, a controller device and multiple robots (i.e., resources). The example system 200 includes components that are substantially similar and function in a similar manner to the components of system 100 such as input modules 210, input orchestrator 220, routine manager 230, active routine(s) 240, output orchestrator 250, and output modules 260. The depicted example shows two robots 280 and 290, however, any number of robots may be managed and controlled through the ROA within the example system 200. The components of the example system 200 may be managed within an ROA hosted on a robot or any system (e.g., a remote system) that provides commands to a series of robots, such as robots 280 and 290.

Input modules 210 function in a similar fashion as the input modules 110 from FIG. 1 and collect and interpret information from the surrounding environment. Output modules 260 function in a similar fashion as the output modules 160 from FIG. 1 and serve as the interface to robotic hardware (or other type output device, such as a monitor) that can be employed to respond to or interact with a user.

The robot 280 includes input and output components position sensors 282, vision module 284, motor feedback 285, motor controller 287, robot base controller 288, and robot arm controller 289. The robot 290 includes input and output components position sensors 292, vision module 294, motor feedback 295, motor controller 297, robot base controller 298, and robot arm controller 299. FIG. 2A depicts robots 280 and 290 with the same input and output modules for simplicity; however, robots used within a system employing the describe ROA can include various and differing input and output modules. Speech recognition module 212, speakers/text-to-speech (TTS) module 262, and screen output module 264 represent modules that are not components of a particular robot but are still controlled by the overall example system 200. In some implementations, each of the input and output modules may be a component of a particular robot. For example, speech recognition module 212 may be a module of robot 280.

In the depicted example system 200, the input modules 210 include the input modules (e.g., position sensors 282 and 292, vision modules 284 and 294, and motor feedback 285 and 295) that are components of the depicted robots 280 and 290 as well as input modules (e.g., speech recognition module 212) that are not components of a particular robot. Likewise, as depicted, the output modules 260 include the output modules (e.g., motor controller 287 and 297, robot base controller 288 and 298, and robot arm controller 289 and 299) that are components of the depicted robots 280 and 290 as well as output modules (e.g., speakers/TTS 262 and screen output 264) that are not components of a particular robot.

Back bone services 270 include input orchestrator 220, routine manager 230, and output orchestrator 250. As described in FIG. 1, these backbone services 270 interpret and carry information, such as commands, to and from the active routines 240. Input orchestrator 220 functions in a similar manner to input orchestrator 120 of FIG. 1, and sends interpreted commands and collected data, such as speech and vision data, to the routine manager 230 and the active routines 240. Routine manager 230 functions in a similar manner to routine manager 130 of FIG. 1, and provides a hub form of communication for the active routines 240. Output orchestrator 250 functions in a similar manner to output orchestrator 150 of FIG. 1, and sends information, such as instructions, to the output modules 260 based on actions/response, such as robot commands and speech responses, determined by active routines 240. As described above, output modules 260 may be standalone components or components for a particular robot, such as robot 280 and 290.

Active routines 240 are substantially similar to active routines 140 of FIG. 1 and include the currently active routines on the robots managed by the ROA system 200, such as robots 280 and 290. In the depicted example system 200, active routines 240 are divided into operating system (OS) level routines 241 and application routines 245. Other grouping of routines may be implemented with the ROA system 200. In some implementation, the OS level routines 241 are be includes with the ROA framework. As depicted, OS level routines 241 includes controller routine 242 and mapping routine 243.

In some implementations, the controller routine 242 provides safety-lever type functions as well as undo robot actions functions. For example, the controller routine 242 may recognize when one of the robots 280 or 290 is performing a dangerous or wrong action. In such an example, controller routine 242 may initiate a shutdown and/or rest routine(s), initiate a routine to undo certain robot actions, and/or determine and activate the appropriate application routine. As a particular example, a command may be passed to the wrong routine and/or used to start a routine that was different from a user's intent. In order to handle these type situations, the controller routine 242 (as well as the input orchestrator 220) may be used within the ROA to recover from the actioned taken by the robot and initiated routines. For example, the controller routine 242 may roll back the incorrect robot response (e.g., the performed actions) and attempt to respond to the input event again (e.g., without the option of sending the input to the incorrect routine). When the controller routine 242 (or the input orchestrator 220) initiates a shut down or rest routine, once the robot has been reactivated (e.g., through a controller or manually) or the reset routine competed, it may again begin performing actions in support of active routines.

In some implementations, the mapping routine 243 receives commands and determines whether any supported routines that are not currently active may fit the context/intent for the received command. In some implementations, mapping routine 243 may initiate a routine once it has been determined that no other active routines may service the command (see. FIG. 4) and the routine has been determined to fit the context/intent for the issued command. More detail regarding this process is provided in the description of FIGS. 3A and 4 below.

Application routines 245 are the action routines for the robot and are the programmable, modular components of the ROA. Application routines may be coded and used to train or teach a robot the respective functionality or scenario. For example, an application routine may program a robot by moving it to a location to actuate and perform a task. Through such an application routine 245, the robot can learn a starting point and ending point and know how to actuate to perform the appropriate functionality to service the routine. Additionally, the functionality for an application routine 245 can range from high-level routines, such as playing games, to low level routines, such as moving from point A to point B. Application routines 245 can be designed for playing blackjack, dealing cards, playing music, making a drink, moving an object, and so forth.

Applications routines 245 may be assigned to particular robots, such as robot 280 and 290, when activated. Application routines 245 are depicted by types 1-3 (246-248) in FIGS. 2A-B, which represent three different programmed activities/functions that may be performed/executed. Three types are shown as an example, but any number of application routines may be support in an ROA.

When an application routine 245 is selected to service a command, it may first be initiated by the mapping routine if it is not in an active state. Once active, the application routine determines instructions for an output module(s) 260 based on the received command and an internal state. For example, within the context of a game of black jack, a black jack dealing application routine may instruct an output module (e.g., a robotic arm) to deal a single card to a player when the player issues the command "hit me" based on the player's current hand and the state of the current game.

In some implementations, application routines 245 may be further divided into two separate types or levels: HLC routines and manipulation routines. In some implementations, HLC routines are responsible for the high-level logic of an application or task. These routines dictate, for example, how a game or function is to behave or what the object of the game or function is. Examples HLC routines include information regarding how does the robot play a shell game, how does the robot shuffle cups or cards, how to determine the grid size given, for example, perceived cup and table size, what is the current grid size, and so forth. HLC routines may also be responsible for reacting to user commands.

In some implementations, manipulation routines provide an interface for other routines to interact with the environment at a high-level. This adds to the out-of-the-box capabilities for a robot employing the ROA by, for example, creating easy to use commands for manipulating objects and/or achieving a goal. Manipulation routines may include routines for how the robot actuates given its ends-effector and environment, where the robot grabs a cup from, and so forth. By using these two routine types, HLC routines and manipulation routines, application routines 245, become more transferable across different robots. For example, to leverage an HLC routine, such as a shell game, across multiple robots, only the manipulation routine(s) that support the HLC routines may need to be updated for each robot or robot type capable of preforming the HLC routine. Accordingly, users of the ROA are provided the flexibility to define their own message types, which can be standardized for each manipulation routine.

Figure 3A:
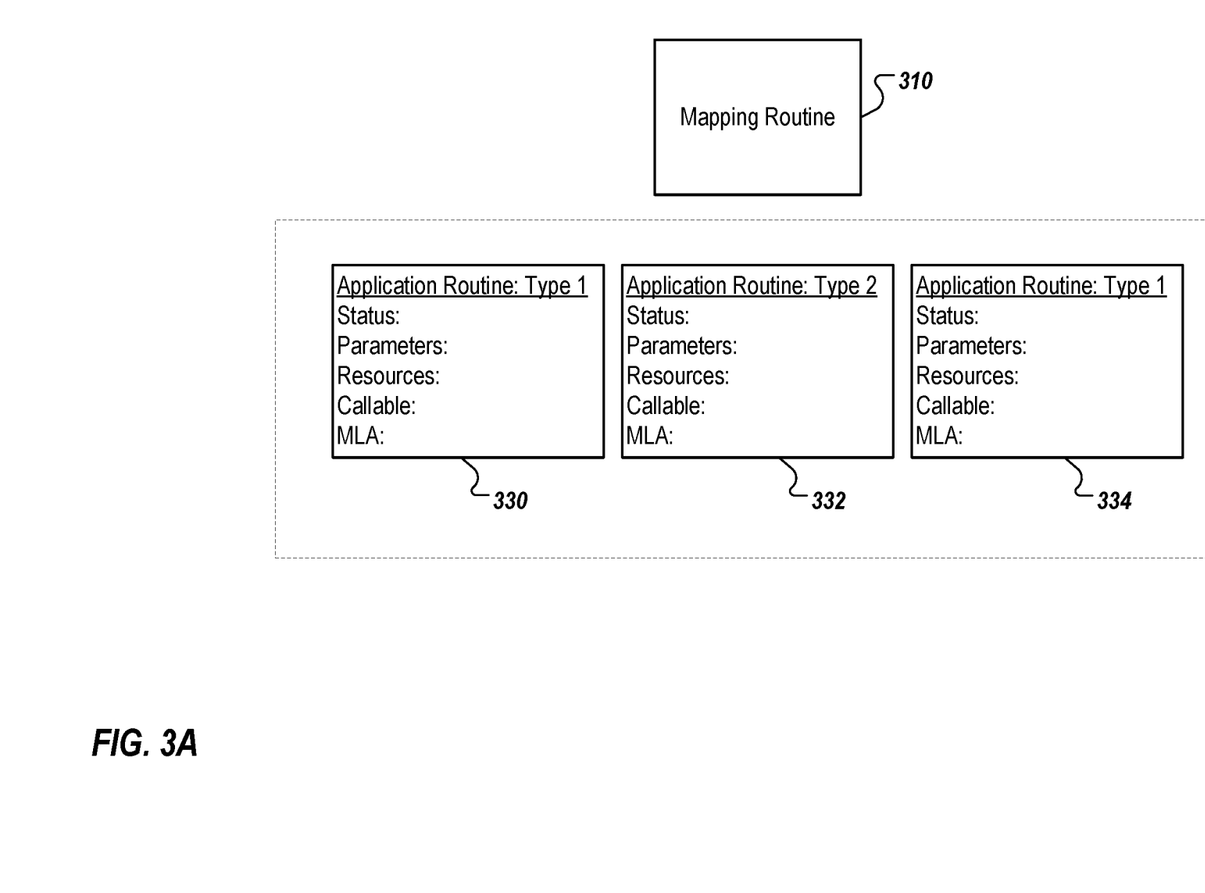
FIG. 3A depicts example routine types implemented as active routines.
Figure 3B:
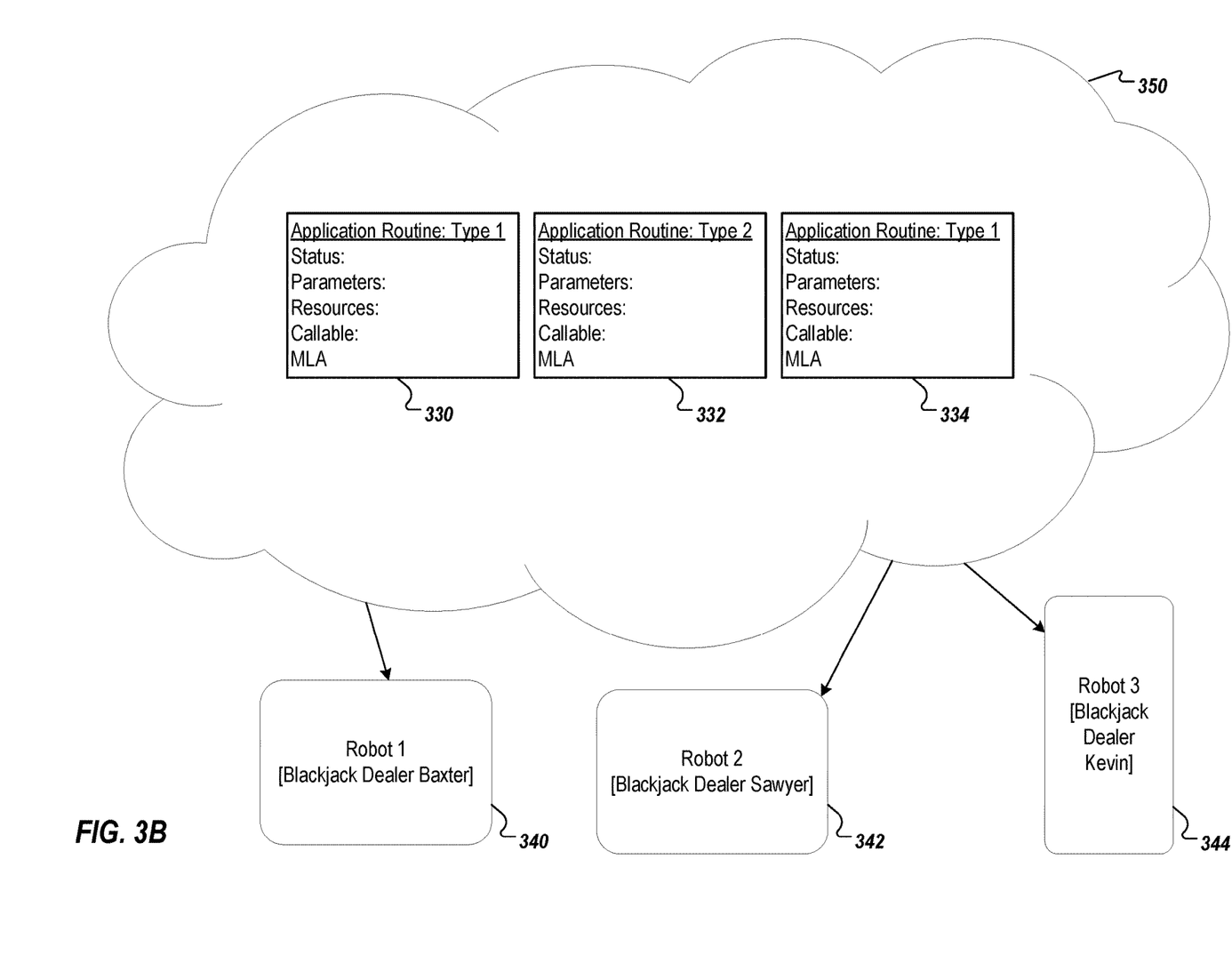
FIG. 3B depicts distribution of application routine types to various robots.
Figure 4:
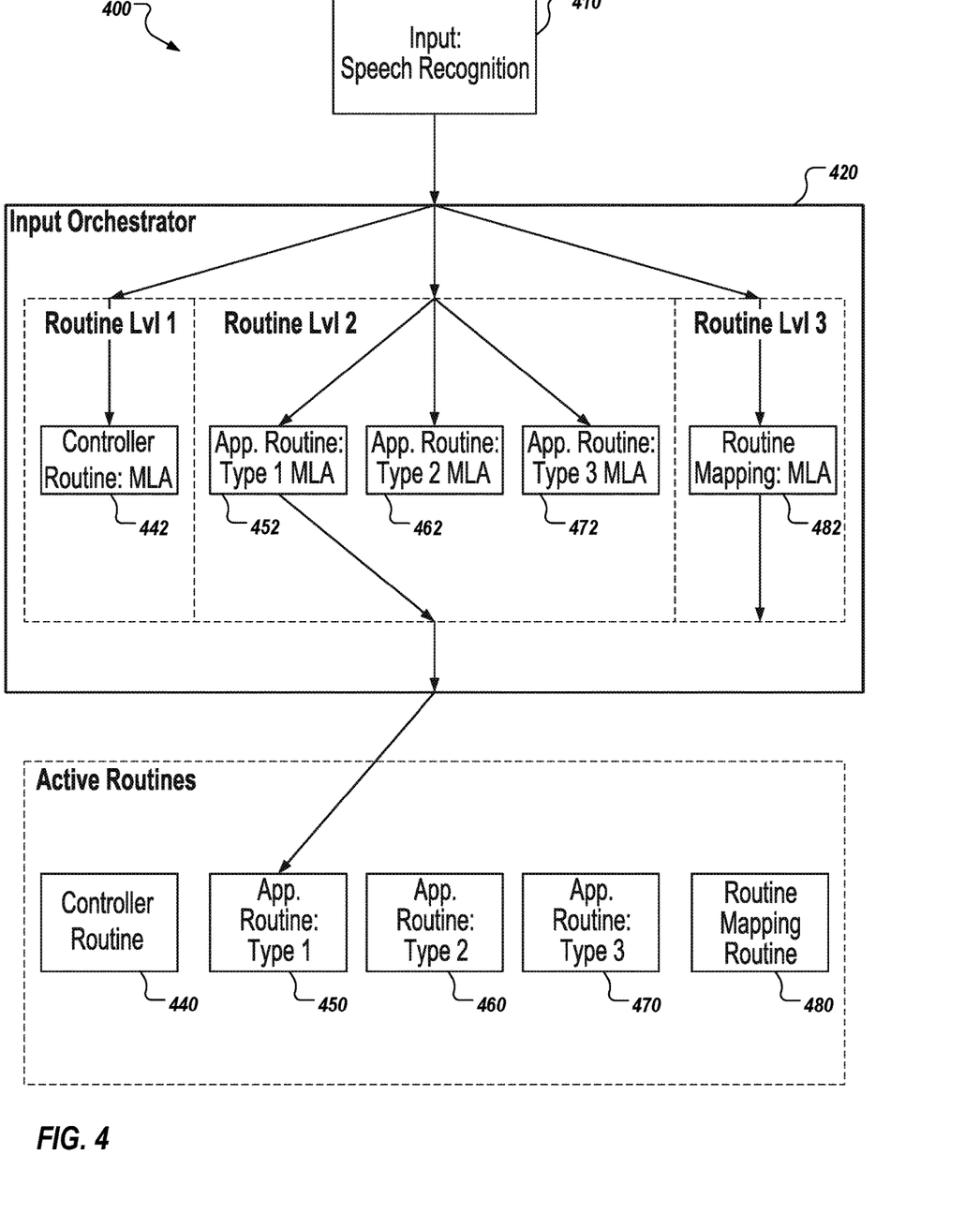
FIG. 4 depicts a portion of an example system for providing communication with the ROA.

FIG. 3A depicts example routine types implemented as active routines in an ROA system, such as ROA systems 100 and 200, according to implementations of the present disclosure. The depicted example includes mapping routine 310, and application routines 330, 332, 334. The depicted example shows one mapping routine and three application routines, however, any number of routines may be employed within an ROA system.

In an example ROA system, a received command may be forwarded to the mapping routine 310 by an input orchestrator when the received command does not map to any of the currently active application or HLC routines. This process is described in greater detail below in reference to FIG. 4. When the mapping routine 310 receives a command, it determines a matching routine from the available application routines on the system to activate in order to satisfy the command based on a determined context for the command and a mapping between the determined context and the available application routines.

To determine the applicable context(s), mapping routine 310 may employ various types of machine learning tools (e.g., MLAs) to synthesize and process data from multiple inputs (e.g., audio and visual). For example, each application routine 330, 332, 334, may include an NLP agent or service that allows received speech to be transformed into an actionable format for the respective routine. NLP agents may be implemented as services that are accessed through a network. The mapping routine 310 may call the NLP agent for each of the possible application routines with the received command and determine potential matches for the command based on the returned values from the NLP agents along with trained mappings of the application routines. Additionally, as described above, the mapping routine may combine inputs, such as vision with speech data, to improve mapping accuracy when large sets of routines are available. The mapping routine then selects an application routine to activate based on the received data and the mapping information.

Once a routine is active, future commands and data, with the exception of a few key commands, are sent to and responded to by the activated routine for a particular context (e.g., the black jack dealer routine receives commands that are relevant to a game of black jack). An active routine may also employ an MLA, such as an NLP agent, which returns an interpretation or action based on the respective context for the routine and the received command (e.g., deal a card when the routine is a black jack dealer based on a received voice command of "hit me.").

The ROA, through a routine manger, such as routine manger 130 and 230, may keep track of the routines and several associated properties. Associated properties for routines may include the status of the routine (e.g., active, inactive, or paused), the resources required for the routine, whether or not this routine can be called by other routines, the parameters needed to call the routine, and the machine learning agent/service (when applicable) for the routine.

FIG. 3B depicts distribution of application routine types implemented in an ROA system, such as ROA systems 100 and 200, to various robots and/or robot systems according to implementations of the present disclosure. The depicted example includes application type routines 330, 332, 334, cloud-based routine repository 350, and robots 340, 342, 344. The depicted example shows three application routines and three robots, however, any number of routines and robots may be employed within an ROA system. In some implementations, routines may be developed and stored using a cloud storage system, such as cloud-based routine repository 350. Cloud storage is a cloud computing model in which data is stored on remote servers accessed from the Internet, or "cloud." In some implementations, a cloud is maintained, operated and managed by a cloud storage service provider on storage servers that are built with various virtualization techniques.

In some implementations, metadata is used to make application routines more reusable between various robots and robot systems, such as robots 340, 342, 344. The metadata includes the information regarding the requirements to operate the respective routine. Example metadata includes input resources and configuration, output resources and configuration, and required subroutines. As a robot is a physical system, some routines may have better results on better hardware. However, minimum thresholds may be set for a particular routine. For example, a blackjack routine may require a robot arm with a certain workspace and gripper type, some form of speech recognition, and some form of vision recognition capable of identifying playing cards. Utilizing this metadata allows an ROA to easily be incorporated with cloud-based routine repositories, such as cloud-based routine repository 350, which can be constantly maintained and updated.

Robots, such as robots 340, 342, 344, may download (or upload) application routines from cloud-based routine repository 350 via a network (or connect directly to a storage server within a data center). Application routines, such as 330, 332, 334, may be transferred between robots or robot systems, such as robots 340, 342, 344, with minimal or no alterations provided the robot/robot system meets the metadata requirements of the routine as described above.

FIG. 4 depicts a portion 400 of an example system, such as systems 100 and 200, for providing communication with the ROA. The system portion 400 depicts how an active routine is selected to determine instruction for an output module based on a received command. The system portion 400 includes a speech recognition input 410, input orchestrator 420, and active routines 440-480. As described above in FIGS. 1 and 2, input orchestrator 420 receives input from various input modules. In the depicted example, the input module is speech recognition module 410. In some implementations, speech recognition module 410 receives information from a sound capturing sensor, such as a microphone, and translates a captured voice command into corresponding text. Speech recognition module 410 then sends the received command in a text format to input orchestrator 420.

In the depicted example, input orchestrator 420 determines the appropriate context and active routine to send the command based on the information returned by each respective MLA 442-482 (e.g., NLP agent) for the active routines 450-480 as well as the internal state of the active routines. For example, the mapping routine MLA 482 may include high-level information on the triggers that can start any non-active routines and thereby determine if a corresponding routine can be started to service a received command.

The depicted hierarchy includes three levels, however, routines may be classified into any number of levels. The depicted example places the OS layer controller routine 440 in the highest level of the hierarchy. When the MLA 442 for this controller routine 440 returns a matching intent, input orchestrator ignores any matching intents from lower layers and forwards the command on to or passes application control to the controller routine 440.

In the depicted example, the input orchestrator 420 forwards the received command to all active routine MLAs 442, 452, 462, 472, and 482 to process and determine the user's intent. For example, an active routine's MLAs may be an NLP agent. Multiple routine MLAs may have a matching intent (e.g., in the depicted example application routine 452 and mapping routing 482 have a matching intent). The input orchestrator passes the command only to the highest level routine with a matching intent (e.g., application routine type 1 450).

In some implementations, the mapping routine 480 may be called by input orchestrator 420 when no active routines match on the intent. When called, the mapping routing 480 identifies and initiates an application routine to satisfy the command, as described, for example, with regard to FIG. 3.

In some implementations, when two routines of the same level (e.g., routine level 2) both have a matching intent, the input orchestrator 420, may either pass the command to the most recently activated routine or to the routine whose MLA returned a matching intent first.

In some examples, multiple active routines may require access to the same resource or a received command may be actionable by multiple active routines. For these types of situations, the ROA may select an active routine to service the received request based on the hierarchy of routines.

Figure 5:
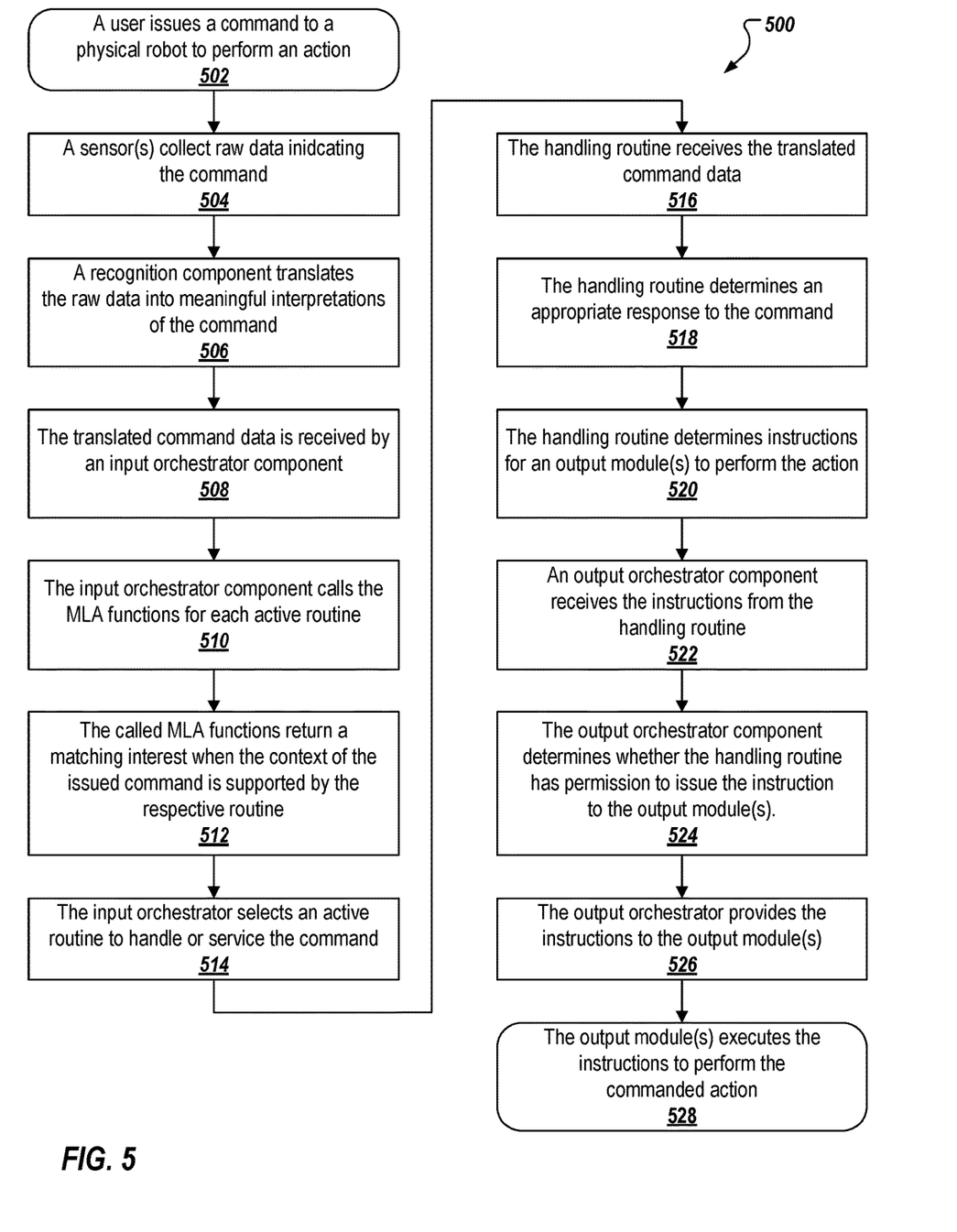
FIG. 5 depicts a flow diagram of an example process for receiving a command and instructing a robot to perform a function.

FIG. 5 depicts a flow diagram of an example process (500) for receiving a command and instructing a robot to perform a function, according to implementations of the present disclosure. A user issues (502) a command to a robot to perform an action. For example, the user may provide the command verbally, with some sort of physical action, or a combination thereof. A sensor(s), which may be on the robot or a part of an overall ROA system, collects (504) raw data indicating the command. A recognition component translates (506) the raw data into meaningful interpretations of the command. For example, a speaker device collects sound wave data, coverts the sound wave data into an audio file, and a speech recognition component converts the recorded speech in the audio file to text.

The translated command data is received (508) by an input orchestrator component from the recognition component. The input orchestrator component calls (510) the MLA functions for each of the active routines with the translated command data. The called MLA functions return (512) a matching interest when the context of the issued command is supported by the respective routine. The input orchestrator selects (514) an active routine to handle or service the received command based on the returned interests from each of the active routines and a hierarchy level for each of the active routines.

The selected active routine (the handling routine) receives (516) the translated command data and determines (518) an appropriate response to the command given the context of the command and the function(s) provided through the active routine. The handling routine determines (520) instructions for an output module(s) to perform the action based on an internal state and the contextual information for the corresponding command. In some implementations, the handling routine may instantiate a subroutine(s) to perform some action or a portion(s) of the overall goal and/or to send instructions to an output module(s).

An output orchestrator component receives (522) the instructions from the handling routine. The output orchestrator component determines (524) whether the handling routine has permission to issue the instruction to the output module(s). When the selected active routine has permission, the output orchestrator provides (526) the instructions from the selected active routine to the output module(s). The output module(s) executes (528) the instructions to perform the commanded action.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical user interface or a Web browser through which a user may interact with an implementation, or any appropriate combination of one or more such back end, middleware, Application Programming Interface (API) or front end components. The components of the system may be interconnected by any appropriate form or medium of digital data communication (e.g., a communication network). Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method for performing an action with a robot, the method being executed by one or more processors and comprising:
   receiving command information indicating a command related to performance of an action with a robot;
   identifying state information for a plurality of active routines that are actively running for the robot, the state information indicating a state for each of the active routines;
   determining contextual information for the command based on the state information for the plurality of active routines;
   selecting one of the active routines as a handling routine to service the command based on the contextual information;
   determining an output module of the robot to perform the action based on the state of the handling routine and the contextual information; and
   executing one or more instructions to perform the action with the output module.

2. The computer-implemented method of claim 1, wherein the command information includes raw sound wave data collected by a sound collecting sensor.

3. The computer-implemented method of claim 2, wherein the command information includes textual data indicating the command, and wherein the textual data is determined by a speech recognition module based on the raw sound wave data.

4. The computer-implemented method of claim 3, wherein the command information includes visual information collected by a light sensor.

5. The computer-implemented method of claim 1, wherein determining the contextual information comprises determining the contextual information based on calls, for each routine of the plurality of active routines, to a machine learning agent associated with the respective active routine that is actively running, and wherein each of the machine learning agents is provided the command information when called.

6. The computer-implemented method of claim 5, wherein each of the machine learning agents returns a matching intent based on a context for the respective active routine and the command information.

7. The computer-implemented method of claim 6, wherein selecting one of the active routines as the handling routine comprises selecting the handling routine based on the returned matching intent from the respective machine learning agent and a level assigned to the handling routine within a defined hierarchy for the active routines.

8. The computer-implemented method of claim 5, wherein at least one of the machine learning agents is a natural language processing service.

9. The computer-implemented method of claim 1, further comprising:
  determining an instruction for a roll back action, wherein the handling routine is a controller routine; and
  executing instructions to perform the roll back action with the output module.

10. The computer-implemented method of claim 1, further comprising:
  determining that the handling routine has permissions to provide the instructions to the output module.

11. The computer-implemented method of claim 1, wherein the output module is a robot base controller or a robot arm controller.

12. The computer-implemented method of claim 1, wherein the active routines were downloaded from a cloud-based routine repository.

13. The computer-implemented method of claim 1, wherein the active routines comprise high-level control (HLC) routines and manipulation routines.

14. One or more non-transitory computer-readable storage media coupled to one or more processors and having instructions stored thereon which, when executed by the one or more processors, cause the one or more processors to perform operations for performing an action with a robot, the operations comprising:
  receiving command information indicating a command for a robot to perform an action using a routine from a first plurality of routines for the robot, each routine from the first plurality of routines enabling the robot to perform a different corresponding action;
  identifying state information for a second plurality of active routines from the first plurality of routines that are actively running for the robot, the state information indicating a state for each routine of the second plurality of active routines;
  determining contextual information for the command using the state information for the second plurality of active routines, the contextual information representing a context in which the command was received for each routine of the second plurality of active routines;
  selecting, from the second plurality of active routines and using the contextual information, a handling routine to service the command;
  determining, from a plurality of output modules of the robot, an output module of the robot to perform the action using the state of the handling routine and the contextual information for the command; and
  executing one or more instructions to perform the action with the output module.

15. The computer-readable storage media of claim 14, wherein the command information includes textual data indicating the command, and wherein the textual data is determined by a speech recognition module based on raw sound wave data collected by a sound collecting sensor.

16. The computer-readable storage media of claim 14, wherein:
  determining the contextual information comprises:
    providing, by a mapping routine and to a machine learning agent for the routine from the second plurality of active routines, the command information to cause the machine learning agent to determine second contextual information for the routine including a matching intent based on a context for the routine and the command information; and
    receiving, by the mapping routine and from the machine learning agent, the second contextual information based on providing to the machine learning agent the command information; and
  selecting the handling routine comprises selecting, from the second plurality of active routines, the handling routine using the matching intent received from the respective machine learning agent and a level assigned to the handling routine within a defined hierarchy for the active routines.

17. The computer-readable storage media of claim 16, wherein the operations further comprise determining that the handling routine has permissions to provide the instructions to the output module, wherein executing one or more instructions to perform the action with the output module is responsive to determining that the handling routine has permissions to provide the instructions to the output module.

18. A system, comprising:
  one or more processors; and
  a computer-readable storage device coupled to the one or more processors and having instructions stored thereon which, when executed by the one or more processors, cause the one or more processors to perform operations for performing an action with a robot, the operations comprising:
    receiving command information indicating a command for a robot to perform an action using a routine from a first plurality of routines for the robot, each routine from the first plurality of routines enabling the robot to perform a different corresponding action;
    identifying state information for a second plurality of active routines from the first plurality of routines that are actively running for the robot, the state information indicating a state for each routine of the second plurality of active routines;
    determining contextual information for the command using the state information for the second plurality of active routines, the contextual information representing a context in which the command was received for each routine of the second plurality of active routines;
    selecting, from the first plurality of routines for the robot and using the contextual information, a routine that is not actively running as a handling routine to service the command;

activating the routine to an initial state to cause the routine to actively run for the robot;

determining, from a plurality of output modules of the robot, an output module of the robot to perform the action using the initial state of the routine and the contextual information for the command; and executing one or more instructions to perform the action with the output module.

19. The system of claim 18, wherein the command information includes textual data indicating the command, and wherein the textual data is determined by a speech recognition module based on raw sound wave data collected by a sound collecting sensor.

20. The system of claim 18, wherein determining the contextual information comprises:

providing, by a mapping routine and to a machine learning agent for a second routine from the second plurality of active routines, the command information to cause the machine learning agent to determine second contextual information for the second routine; and receiving, by the mapping routine and from the machine learning agent, the second contextual information based on providing to the machine learning agent the command information.

* * * * *